July 24, 1962  S. M. BERNSTEIN  3,045,581
BROILER CHARCOAL HOLDER AND FOOD RACK
Filed May 15, 1959  3 Sheets-Sheet 1

Inventor
Samuel M. Bernstein
By Silverman, Mueller & Cass
Attorneys

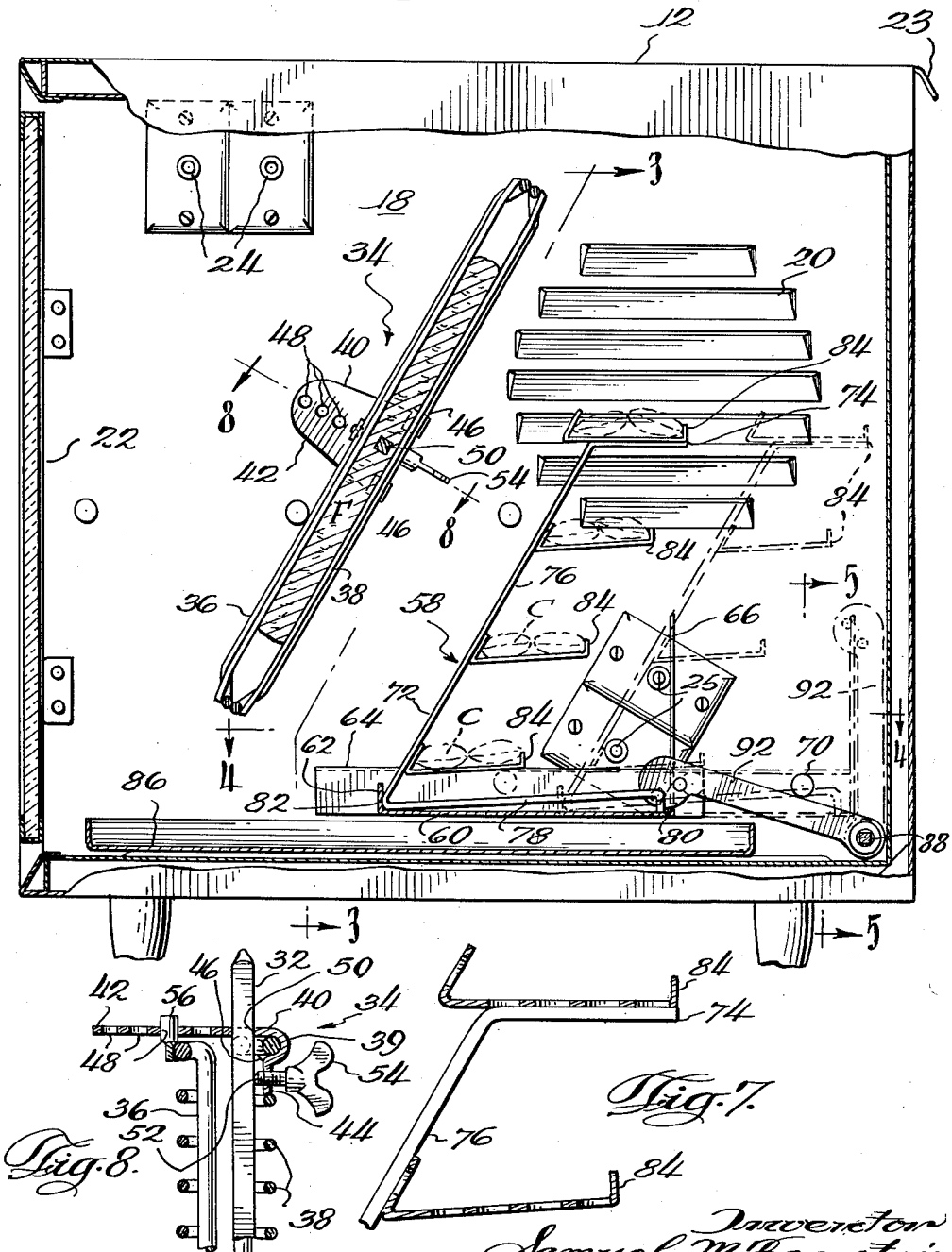

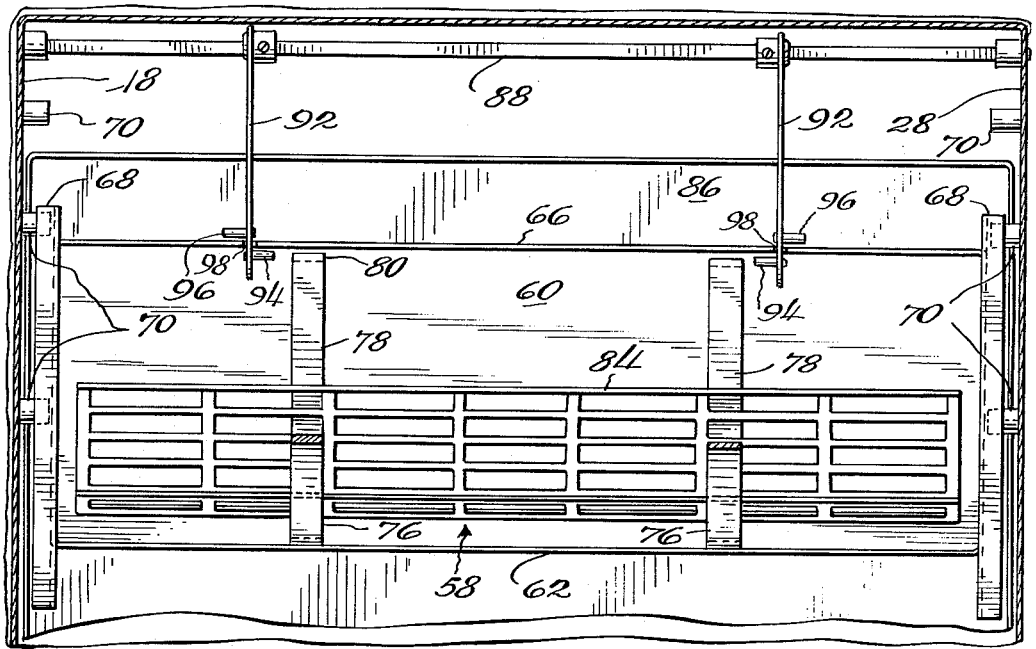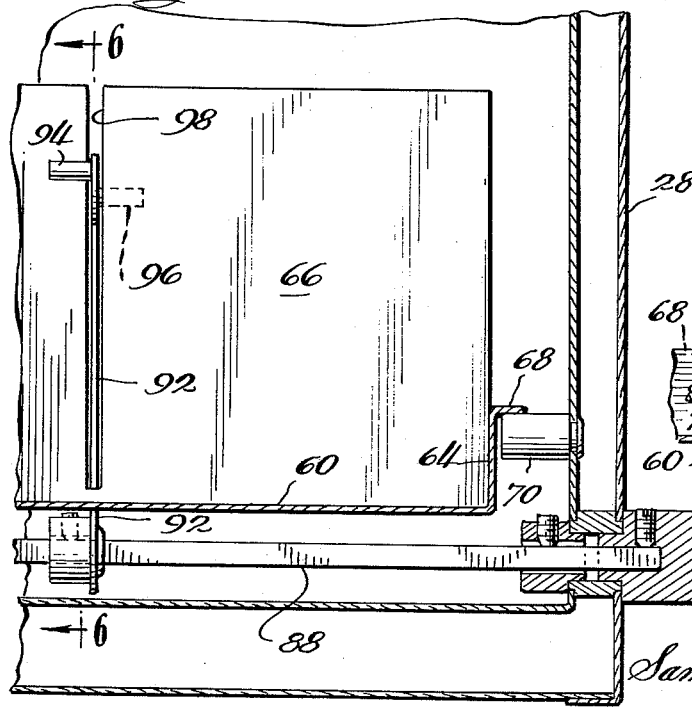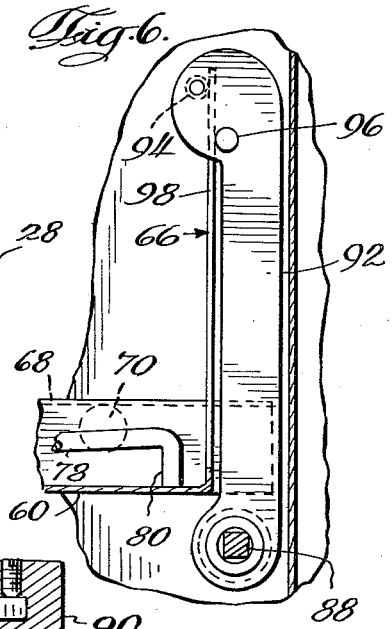

United States Patent Office 3,045,581
Patented July 24, 1962

3,045,581
BROILER CHARCOAL HOLDER AND
FOOD RACK
Samuel M. Bernstein, Winnetka, Ill., assignor to Berns
Air King Corporation, Chicago, Ill., a corporation of
Illinois
Filed May 15, 1959, Ser. No. 813,542
10 Claims. (Cl. 99—340)

This invention relates generally to charcoal broilers and combination electric and charcoal cooking devices, and more particularly it relates to improvements in charcoal holders and food racks for use in such devices.

The use of portable electric table broilers and rotisseries for indoor cooking is of course well known. Similarly, broiling with charcoal and other combustible fuels is becoming increasingly popular, although heretofore this type of cooking has generally been limited to the outdoors because of the practical problems attendant the use of such odoriferous and smoke emitting fuels. As disclosed in my co-pending applications, Serial No. 793,558, filed February 16, 1959, now Patent No. 2,969,450; Serial No. 766,107, filed October 8, 1958, now Patent No. 2,956,497, and Serial No. 715,269, filed February 14, 1958, now Patent No. 2,929,373; these problems have now been substantially overcome by the portable indoor charcoal and combination electric and charcoal cooking devices disclosed therein.

While the cooking devices disclosed in the abovementioned co-pending applications represented a major advancement in the cooking device art, the use of a fuel such as charcoal engendered additional problems. While said cooking devices were adequate for coping with said problems, they did not completely solve the same. For example, it is well known that it is often desirable to regulate or adjust the amount of heat applied to the food which is being cooked. Thus, whereas in a cooking device such as the usual kitchen stove, the heat source may be varied or regulated so that any desired heat may be utilized, the above described cooking devices had no means whereby the intensity or degree of heat applied to the food by the charcoal fire could be regulated.

It is therefore an important object of this invention to provide a combination electric and charcoal cooking device of the character described having means for regulating the intensity and degree of heat applied to the food being cooked.

An object relating to the foregoing is to construct a cooking device of the character described wherein the charcoal heat source may be readily moved toward or away from the food whereby to raise or lower the temperature of the heat as it is delivered to the food being cooked.

An objectionable feature heretofore prevalent in most charcoal broiler devices resulting from the cooking of the food directly over the charcoal fire, was the dripping of melted fat or food particles into the fire during the cooking operations. This was objectionable since it affected the uniformity of the heat, caused undesirable smoking and excessive vapor and odoriferous discharges, and often caused the charcoal briquettes to flare up, sometimes searing the food as it was being cooked.

It is therefore another important object of this invention to afford a cooking device of the character described in which the food is not positioned directly over the charcoal fire, but instead is positioned to one side adjacent thereto.

A further object is to provide a cooking device of the character described having means for suspending the food vertically or at any other desired angle, thereby insuring more flavorful cooking and a greater degree of uniformity therein.

Yet another object is to afford a cooking device of the character described in which the food holding means may be readily removed from the device or re-inserted therein as desired. In this regard it is contemplated that the food holding means may be utilized to facilitate the removal of the hot cooked food from the device and the serving thereof. Further, when the food holding means is removed, the device may then be used as a conventional electric table broiler.

Yet a further object is to provide a cooking device of the character described in which the charcoal holder with the fire therein may be readily moved as desired by manipulation from outside the device.

Still another object is to afford a cooking device of the character described in which the charcoal holder includes a plurality of vertically spaced trays whereby any desired amount of heat may be utilized at various vertical levels in the device.

Still a further object is to provide a cooking device of the character described which is relatively inexpensive and yet is sturdy, effective and attractive, even for indoor use in the beautifully decorated home.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

FIG. 2 is an enlarged sectional view taken on the plane of line 2—2 in FIG. 1 and viewed in the direction indicated, with portions of the outer housing shown in elevation;

FIG. 4 is a fragmentary sectional view taken on the plane of line 4—4 in FIG. 2 and viewed in the direction indicated;

FIG. 5 is a further enlarged fragmentary sectional view taken on the plane of line 5—5 in FIG. 2 and viewed in the direction indicated;

FIG. 6 is a fragmentary sectional view taken on the plane of line 6—6 in FIG. 5 and viewed in the direction indicated;

FIG. 7 is a fragmentary sectional detail view taken on the plane of line 7—7 in FIG. 3 and viewed in the direction indicated; and FIG. 8 is a fragmentary sectional view taken on the plane of line 8—8 in FIG. 2 and showing another detail of construction.

Figure 1:
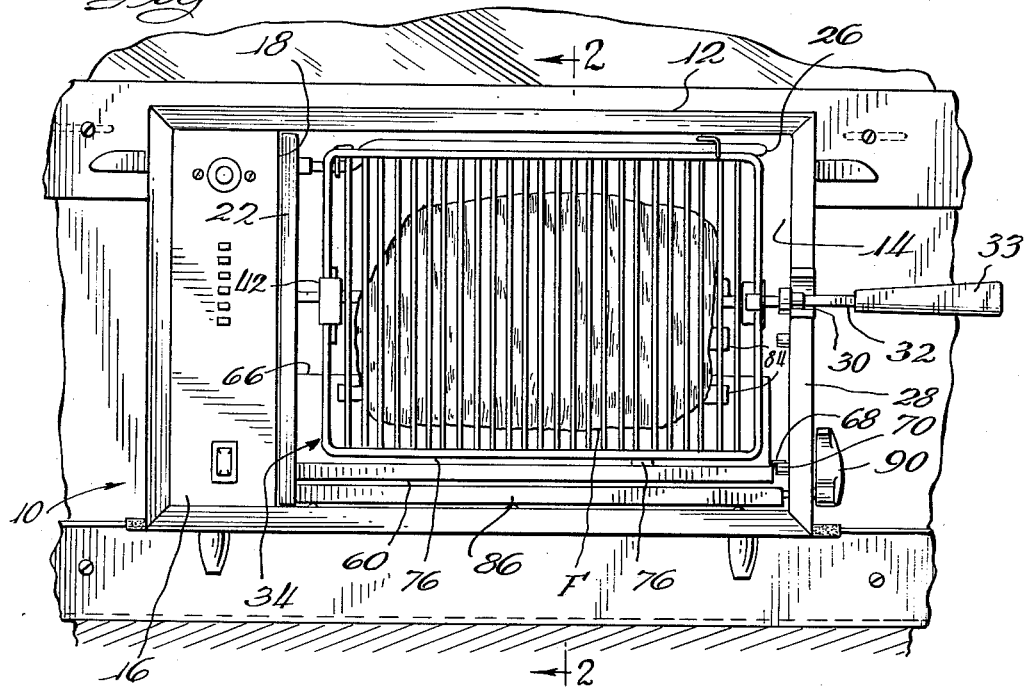
FIG. 1 is a front elevational view of a combination electric and charcoal cooking device embodying the principles of the invention, the front door thereof being open to show the removable food rack positioned therein.

Turning first to FIG. 1 of the drawings, the reference numeral 10 indicates generally a portable combination electric and charcoal cooking device of the type disclosed in the abovementioned co-pending applications. The cooking device 10 will be described only in so much detail as is necessary to afford proper understanding of the instant improvements thereto. Thus, the cooking device 10 may comprise an insulated housing 12 which defines a cooking chamber 14 and a second chamber (not shown), said second chamber being closed at the front of the device by a control panel such as 16. The cooking chamber 14 and second chamber may be separated by a common wall 18 which may be formed with a grid covered exhaust opening 20 (see FIG. 2) through which may be exhausted the atmosphere of the cooking chamber 14. The front of the cooking chamber 14 may be closed by a hingedly mounted glass door 22, and a flange such as 23 may be provided for removably mounting the cooking device 10 in a window opening.

Positioned on the common wall 18 may be a plurality of electrical receptacles such as 24 and 25 into which may be selectively plugged an electric heating element such as 26 when electric heat is desired for cooking. An additional function of the receptacles 25 and heating element 26 in conjunction with the instant improvements will be described as the description proceeds.

The opposite end of the cooking chamber 14 may be closed by an end wall such as 28. The end wall 28 is formed with a slot 30 by means of which a spit 32 having a handle 33 may be removably connected to a rotisserie motor mounting member (not shown). The spit 32 may likewise be connected to the rotisserie motor mounting member for other purposes which will now be described.

To hold the meat or other food F in cooking relationship within the cooking chamber 14, I have provided a novel food rack designated generally by the numeral 34. Turning to FIGS. 2 and 8 it will be seen that the rack 34 comprises a pair of semi-flexible wire rod grill members 36 and 38. The grill member 38 has a pair of outer vertical rods such as 39. Pivotally mounted on each of the outer vertical rods 39 of the grill member 38 is a locking member 40. The locking member 40 comprises a tongue-like leg 42 and a shorter perpendicular leg 44. Portions 46 of the leg 44 are return bent about the rod 39 to pivotally mount the same thereon, and any suitable means (not shown), may be used to hold the locking member 40 in the position indicated to prevent the same from sliding on the rod 39. The leg 42 may be formed with a plurality of spaced circular openings such as 48, and another opening such as 50 which is of complementary shape with the spit 32. In the embodiment illustrated, the spit 32 and opening 50 are square shaped, but it should be apparent that any other suitable shape such as triangular, hexagonal or the like may likewise be used. The leg 44 may be formed with an internally threaded opening 52 which is adapted to accommodate a winged thumb screw such as 54. Secured to each of the outer vertical rods of the grill member 36 may be a pin such as 56.

The rack 34 may now be operationally assembled and positioned in the cooking chamber 14 as follows. The meat or other food F is placed on the grill member 38 and the grill member 36 is connected to the grill member 38 to securely clamp the food F therebetween by inserting each of the pins 56 in the proper openings 48. It will thus be apparent that the food F may be securely held in the rack 34 irrespective of the particular thickness thereof. The spit 32 may then be threaded through the pair of aligned openings 50 and the thumb screws 54 tightened to prevent lateral motion of the rack 34 on the spit 32. The assembled rack 34 may now be operationally positioned in the cooking device 10 at any desired angle, but preferably at an oblique angle as indicated in FIG. 2, for reasons which will become apparent as the description proceeds. It should be understood, of course, that when the food rack 34 is operationally positioned as described, the rotisserie motor will not generally be operating.

After the food F has been cooked, the removal thereof from the cooking device 10 for serving is equally as simple. The entire assembly is removed from the cooking device 10 and the screws 54 are loosened. The spit 32 is withdrawn from the rack 34 and then the locking members 40 are pivoted outwardly to disengage the pins 56. The disconnected grill member 36 may now be removed and the food F is ready for serving.

Referring again to FIG. 2 of the drawings, it will be seen that I have provided a novel charcoal holder designated generally by the numeral 58. The charcoal holder 58 comprises a relatively shallow tray 60 having a front wall 62, a pair of side walls 64, 64 and a rear wall 66. It is important to note that the rear wall 66 is of considerably greater height than the other tray walls for reasons which will become apparent as the description proceeds. It should likewise be noted that the side walls 64 extend beyond the front wall 62 and rear wall 66 for reasons which will now be described.

Figure 3:
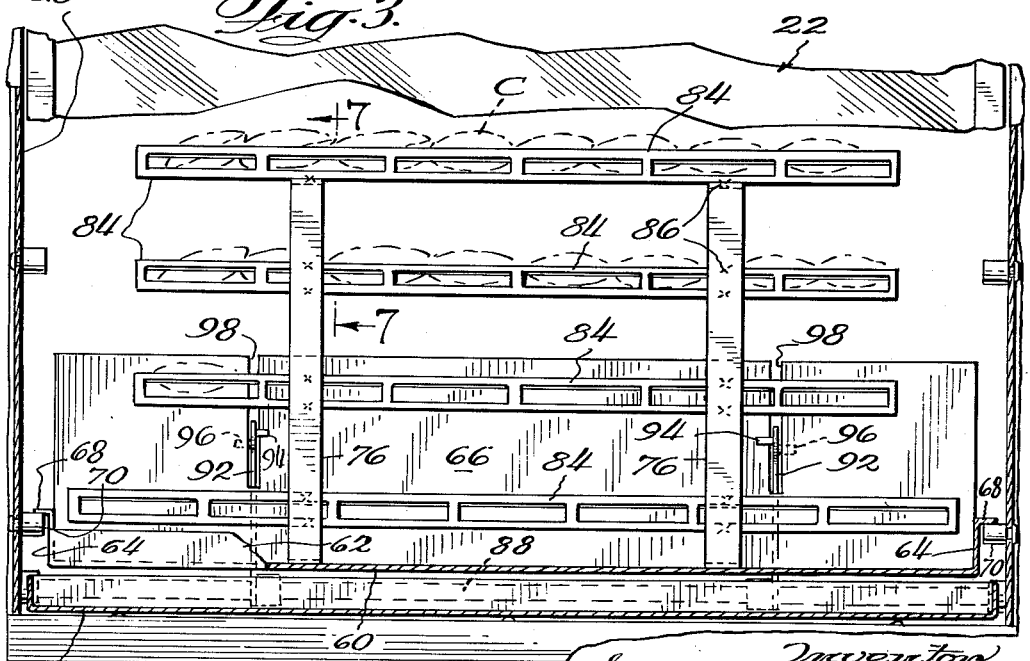
FIG. 3 is a fragmentary sectional view taken substantially along the plane of irregular line 3—3 in FIG. 2 and viewed in the direction indicated.

Projecting outwardly from each of the side walls 64 is a flange 68 (see FIGS. 3–5). Mounted on the common wall 18 and the end wall 28 are a plurality of aligned and spaced apart roller members 70. The tray 60 is removably and freely supported on the roller members 70 by means of the flanges 68, as seen in the various figures of the drawings. It will thus be seen that the tray 60 is free to slide in either direction on the trackway provided by the roller members 70. In this regard, the roller members 70 may themselves be rotatable on bearings or they may simply be stationary and circular in shape (as in the embodiment shown for illustration) so as to provide one-point, relatively friction-free suspension.

Removably supported in the tray 60 is an upstanding frame which includes a pair of angular support bars 72, 72. Each of the support bars 72 comprises a horizontal top arm 74, a vertically inclined leg 76, a horizontally inclined leg 78 and a short vertical base leg 80. It should be noted that the planes of legs 76 and 78 are acutely angular one to the other thereby affording a sharp angular corner 82. Thus, the support bars 72 are firmly supported in the tray 60 in a slightly forwardly pitched relationship with the corners 82 abutting the tray front wall 62. Secured to the upright legs 76 in vertically spaced relationship are a plurality of horizontal charcoal grate trays 84. The grates 84 may be secured to the support bars 72 by any suitable means such as spot welding 86 (see FIG. 3).

Charcoal briquettes such as C may be positioned in any or all of the grates 84. It is important to note here that in the most efficient relationship of food rack 34 and charcoal holder 58 (the arrangement shown in FIG. 2) the legs 76 are in parallel spaced relationship with the rack 34. Thus, all portions of the food F are uniformly affected by the heat generated by the charcoal fire. In addition, it is important to note that no grease or juices such as are normally exuded by the cooking food can drip upon the charcoal fire. As the juices and melted grease are formed they immediately collect upon the grill members 36 and 38 and run down the inclined plane of the same to drip off the lowest edge thereof. As seen in FIG. 2 the bottom edge of the grill is spaced forwardly of the charcoal fire. To collect the drippings a grease pan such as 86 may be removably positioned in the cooking chamber 14.

For reciprocating the charcoal holder 58 to achieve the desired degree of heat upon the cooking food F and to insure that juices or melted grease do not drip onto the fire, I have provided novel means which will now be described. Rotatably mounted adjacent the lower rear corner of the cooking chamber 14 is an actuating rod 88. The actuating rod 88 extends out of an opening in the end wall 28 and a suitable handle such as 90 is mounted thereon for manipulating the same from outside the cooking chamber 14. Mounted on the actuating rod 88 is a pair of lever arms 92, 92. Secured in staggered relationship to each of the lever arms 92 adjacent the free end thereof is a pair of spaced apart bearing pins 94 and 96. The bearing pins 94 and 96 may project from opposite sides of the lever arm 92, as seen in FIGS. 3–5.

The rear wall 66 of the tray 60 is formed with a pair of vertical slots 98 which open to the top of said wall. The lever arms 92 are reciprocably positioned within the slots 98 with the rear wall 66 engaged between the pairs of bearing pins 94 and 96. To move the charcoal holder 58 it is necessary only to rotate the handle 90 in the desired direction. This causes the lever arms 92 to move and the angular motion thereof is translated into the linear motion of the charcoal holder 58 by means of the engagement of the rear wall 66 between the bearing pins 94 and 96. The charcoal holder 58 may thus be readily moved as close to the rack 34 as necessary to provide the desired degree of cooking heat. Thus, for example, in FIG. 2, the charcoal holder 58 is shown in the extreme forward position to furnish the greatest degree of heat to the food F. In FIG. 6, and in the dotted outline showing of FIG. 2, the charcoal holder 58 is shown in the extreme rearward position to furnish the minimum degree of heat.

To eliminate the need of dangerous flammable fuels to ignite the charcoal, the heating element 26 may be utilized for this purpose. As seen in FIG. 2, when the charcoal holder 58 is in the position of the dotted outline showing, the charcoal contained therein may be readily ignited by the heating element 26 if plugged into the receptacles 25.

While the food rack 34 has been described in detail, it should be understood that the charcoal holder 58 may be used with equal effectiveness when a fowl, roast, or the like, is positioned directly on the spit 32 and the same is being rotated by the rotisserie motor. In that event, the novel charcoal holder and reciprocating means permit the charcoal fire to be moved far enough rearwardly so that food juices or melted grease will not drip thereon.

From the foregoing description and drawings, it should be apparent without further description that I have provided a cooking device incorporating a novel charcoal holder and food rack. The charcoal holder may be readily manipulated to bring the charcoal fire as close as desired to the cooking food. At the same time, the novel construction of the charcoal holder insures that no greases or juices from the cooking food can drip onto the charcoal fire. The novel food rack permits the food to be suspended at the most desirable angles for achieving most uniform cooking and for insuring that none of the greases or juices from the food drip onto the charcoal fire. In addition, the rack requires no additional parts for mounting the same in the cooking chamber, the same being adapted to utilize the cooking device's regular rotisserie spit for this purpose.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. In a portable indoor cooking device including a housing having a cooking chamber therein, mounting means for removably mounting said housing in a building outer wall opening and exhaust means for exhausting the atmosphere of said cooking chamber to the outdoors through said building outer wall opening; food supporting means for supporting food in operational position, a charcoal holder movably mounted in said cooking chamber adjacent to and in horizontal spaced relationship with said food supporting means, and control means for varying the horizontal spaced relationship between said charcoal holder and said food supporting means, said charcoal holder comprising a tray having a rear wall and a frame removably supported in said tray, said rear wall being formed with a pair of spaced vertical slots, said control means comprising a rotatable actuating rod, a pair of lever arms secured to said actuating rod, and a pair of spaced apart bearing pins secured to the free end of each of said lever arms, said lever arms reciprocably positioned in said vertical slots with portions of said rear wall engaged between said pairs of bearing pins.

2. The cooking device of claim 1 in which said actuating rod projects through an opening in said housing so that the same may be manipulated from outside of said housing.

3. The cooking device of claim 2 in which said frame comprises a pair of angular support bars each having a horizontal top arm, a vertically inclined front leg, a horizontally inclined bottom leg, and a plurality of vertically spaced charcoal grate trays secured to said vertically inclined front legs.

4. A portable indoor charcoal cooking device comprising a housing having a cooking chamber therein, exhaust means for exhausting the atmosphere of said cooking chamber, food supporting means removably positioned in said cooking chamber for supporting food in operational position, a charcoal holder movably mounted in said cooking chamber adjacent to, and in horizontal spaced relationship with, said food supporting means, said charcoal holder comprising a tray having a rear wall and a frame removably supported in said tray, said rear wall being formed with a pair of spaced vertical slots, and control means associated with said rear wall and vertical slots for moving said tray and varying the horizontal spaced relationship between said charcoal holder and said food supporting means, said food supporting means comprising a spit and a removable food rack associated with said spit, said food rack cooperating with said spit for supporting the food to be cooked at any desired angle with relation to said charcoal holder, said food rack comprising a first and second wire rod grill member, each of said grill members having a pair of outer rods, a locking member pivotally secured to each of the outer rods of said first grill member, a locking pin secured to each of the outer rods of said second grill member, said locking pins cooperating with said locking members to connect said grill members together and securely clamp the food to be cooked therebetween.

5. The cooking device of claim 4 in which said locking member comprises a tongue-like leg and an integrally formed perpendicular leg, portions of said perpendicular leg being return bent about said outer vertical rods to pivotally secure the locking member thereto, said tongue-like leg formed with a plurality of spaced openings for selectively accommodating said locking pins, said tongue-like leg formed with a further opening of the same configuration as said spit for accommodating said spit therethrough, said perpendicular leg being formed with a threaded opening, a lock screw positioned in said threaded opening, and said lock screw adapted to bear against said spit to prevent lateral motion of said food rack thereon.

6. In a portable indoor cooking device including a housing having a cooking chamber therein, mounting means for removably mounting said housing in a building outer wall opening and exhaust means for exhausting the atmosphere of said cooking chamber to the outdoors through said building outer wall opening; food supporting means for supporting food in operational position, a charcoal holder movably mounted in said cooking chamber adjacent to and in horizontal spaced relationship with said food supporting means, control means for varying the horizontal spaced relationship between said charcoal holder and said food supporting means, a plurality of electric receptacles mounted in a wall of said cooking chamber one near the top and the other near the bottom thereof and a removable electric heating element, said charcoal holder being positioned near the bottom of said cooking chamber, said electric receptacles connected into an electrical circuit, each of said receptacles removably accommodating said heating element for selectively positioning the same in said one receptacle whereby the heating element comprises a heat source for cooking and in said other receptacle whereby the same comprises means for igniting the charcoal in said charcoal holder.

7. In a food cooking device including food supporting means: a charcoal holder comprising a movable tray having a rear wall, said rear wall being formed with a pair of spaced vertical slots, a vertically angular frame removably supported in said tray for supporting burning charcoal in horizontal spaced relationship with said food supporting means, and control means associated with said rear wall and vertical slots for moving said tray and varying the horizontal spaced relationship between said angular frame and said food supporting means, said frame comprising a pair of angular support bars each having a horizontal top arm, a vertically inclined front leg, a horizontally inclined bottom leg, and a plurality of vertically spaced charcoal grate trays secured to said vertically inclined front legs.

8. In a food cooking device including food supporting means; a charcoal holder comprising a movable tray having a rear wall, said rear wall being formed with a pair of spaced vertical slots, a vertically angular frame removably supported in said tray for supporting burning charcoal in horizontal spaced relationship with said food supporting means, said frame comprising a pair of angular support bars each having a horizontal top arm, a vertically inclined front leg, a horizontally inclined bottom leg, and a plurality of vertically spaced charcoal grate trays secured to said vertically inclined front legs, and means for varying said horizontal spaced relationship, said means comprising a rotatable actuating rod, a pair of lever arms secured to said actuating rod, and a pair of spaced apart bearing pins secured to the free end of each of said lever arms, said lever arms reciprocably positioned in said vertical slots with portions of said rear wall engaged between said pairs of bearing pins.

9. A portable indoor combination electric and charcoal cooking device comprising a housing having a cooking chamber therein, exhaust means for exhausting the atmosphere of said cooking chamber, a spit for positioning food in cooking relationship in said cooking chamber, a charcoal holder slidably positioned in said cooking chamber, said charcoal holder comprising a front wall, a pair of side walls, a rear wall and a vertically angular frame for supporting burning charcoal in horizontal spaced relationship with said spit, said rear wall being formed with a pair of spaced vertical slots, said frame comprising a pair of angular support bears having a horizontal top arm, a vertically inclined leg, a horizontally inclined leg, a short vertical leg and a plurality of vertically spaced charcoal grate trays secured to said vertically inclined legs, control means for moving said charcoal holder and varying the horizontal relationship between said spit and burning charcoal, said control means comprising an actuating rod rotatably mounted in said cooking chamber, a pair of lever arms secured to said actuating rod, and a pair of spaced apart bearing pins secured to the free end of each of said lever arms, said lever arms reciprocably positioned in said vertical slots with adjacent portions of said rear wall engaged between said pairs of bearing pins, a plurality of electric receptacles mounted in a wall of said cooking chamber, and a removable electric heating element, said electric receptacles connected into an electrical circuit, each of said electric receptacles removably accommodating said heating element for selectively positioning the same whereby in one position the heating element comprises a heat source for cooking and in another position the same comprises means for igniting said charcoal.

10. The cooking device of claim 9 in which a food rack is provided for cooperating with said spit to support food to be cooked at any desired angle with relation to said charcoal holder.

References Cited in the file of this patent

UNITED STATES PATENTS

| | | |
|---|---|---|
| 1,080,671 | Anthony | Dec. 9, 1913 |
| 1,492,582 | Smith | May 6, 1924 |
| 1,711,778 | Elbert | May 7, 1929 |
| 1,713,664 | Kress | May 21, 1929 |
| 2,335,217 | Tate | Nov. 23, 1943 |
| 2,441,190 | Fuller | May 11, 1948 |
| 2,590,470 | Skocic | Mar. 25, 1952 |
| 2,626,559 | Rau | Jan. 27, 1953 |
| 2,682,830 | Kupchik | July 6, 1954 |
| 2,798,617 | Schreiber | July 9, 1957 |
| 2,839,989 | Persinger | June 24, 1958 |
| 2,848,119 | Fitser | Aug. 19, 1958 |
| 2,891,465 | Rogge | June 23, 1959 |